(12) United States Patent
Gareau et al.

(10) Patent No.: US 10,637,604 B2
(45) Date of Patent: Apr. 28, 2020

(54) FLEXIBLE ETHERNET AND MULTI LINK GEARBOX MAPPING PROCEDURE TO OPTICAL TRANSPORT NETWORK

(71) Applicants: Sebastien Gareau, Ottawa (CA); Eric Maniloff, Ottawa (CA)

(72) Inventors: Sebastien Gareau, Ottawa (CA); Eric Maniloff, Ottawa (CA)

(73) Assignee: Ciena Corporation, Hanover, MD (US)

( * ) Notice: Subject to any disclaimer, the term of this patent is extended or adjusted under 35 U.S.C. 154(b) by 307 days.

(21) Appl. No.: 14/564,987

(22) Filed: Dec. 9, 2014

(65) Prior Publication Data

US 2016/0119075 A1  Apr. 28, 2016

Related U.S. Application Data

(60) Provisional application No. 62/068,315, filed on Oct. 24, 2014.

(51) Int. Cl.
| | |
|---|---|
| *H04J 14/02* | (2006.01) |
| *H04Q 11/00* | (2006.01) |
| *H04L 12/64* | (2006.01) |
| *H04J 3/16* | (2006.01) |
| *H04B 10/27* | (2013.01) |

(52) U.S. Cl.
CPC .......... *H04J 14/0227* (2013.01); *H04B 10/27* (2013.01); *H04J 3/1652* (2013.01); *H04L 12/6418* (2013.01)

(58) Field of Classification Search
CPC . H04J 14/0227; H04B 10/27; H04Q 11/0066; H04Q 2011/0086
See application file for complete search history.

(56) References Cited

U.S. PATENT DOCUMENTS

| 8,718,471 B2 | 5/2014 | Prakash et al. |
|---|---|---|
| 2010/0040370 A1 | 2/2010 | Aoki et al. |

(Continued)

FOREIGN PATENT DOCUMENTS

| CN | 103795605 A | 5/2014 |
|---|---|---|
| WO | 2013125621 A1 | 8/2013 |

OTHER PUBLICATIONS

Exar :Transporting Any Client Signal in the OTN (Oct. 2011).*

(Continued)

*Primary Examiner* — Charles C Jiang
*Assistant Examiner* — Voster Preval
(74) *Attorney, Agent, or Firm* — Clements Bernard Walker; Christopher L. Bernard; Lawrence A. Baratta, Jr.

(57) ABSTRACT

A flexible mapping method to map a Physical Coding Sublayer (PCS) structure from Flexible Ethernet and/or Multi Link Gearbox (MLG) to Optical Transport Network (OTN), includes receiving one or more Virtual Lanes; and mapping each of the one or more Virtual Lanes into a Tributary Slot, wherein a rate and number of the Tributary Slot(s) in OTN is set based on a rate and number of the one or more Virtual Lanes. A transport system and a flexible de-mapping method are also described. The systems and methods map the generalized MLG-style group of lanes (virtual PHYs/PMDs) into an OPUflex Tributary Slot (TS) structure, keeping PCS structures intact, and creates a single ODUflex container with a matching rate of FlexE for end-to-end flow.

8 Claims, 12 Drawing Sheets

(56) References Cited

U.S. PATENT DOCUMENTS

| | | | |
|---|---|---|---|
| 2010/0158518 A1* | 6/2010 | Shin | H04J 3/0605 398/45 |
| 2010/0299578 A1* | 11/2010 | Shin | H03M 13/251 714/776 |
| 2013/0308943 A1 | 11/2013 | Young et al. | |
| 2014/0093235 A1 | 4/2014 | Gareau et al. | |
| 2014/0133653 A1* | 5/2014 | Loprieno | H04L 9/3226 380/256 |
| 2014/0286346 A1* | 9/2014 | Ghiasi | H04L 45/60 370/401 |
| 2015/0078406 A1* | 3/2015 | Caggioni | H04J 3/1664 370/537 |
| 2015/0104178 A1* | 4/2015 | Su | H04B 10/27 398/79 |
| 2015/0106679 A1* | 4/2015 | Caggioni | H04L 1/0076 714/776 |
| 2015/0281129 A1* | 10/2015 | Kono | H04L 49/70 370/359 |
| 2015/0358431 A1* | 12/2015 | Loprieno | H04J 3/1658 398/45 |
| 2016/0020978 A1* | 1/2016 | Giannakopoulos | H04L 43/12 370/252 |
| 2016/0191277 A1* | 6/2016 | Li | H04L 1/0026 370/465 |
| 2016/0197743 A1* | 7/2016 | Su | H04L 47/00 370/401 |
| 2017/0230736 A1* | 8/2017 | Su | H04Q 11/00 |

OTHER PUBLICATIONS

Exar :Transporting Any Client Signal in the OTN (Oct. 2011) (Year: 2011).*

Winterling, Peter, "100 Gigabit Ethernet—Fundamentals, Trends, and Measurement Requirements," JDSU, Oct. 2010, pp. 1-10.

Zhao et al., "The Prospect of Inter-Data-Center Optical Networks," Optical Technologies for Data Center Networks, Sep. 2013, pp. 32-38.

Matsumoto, Craig, "Google Wants Variable-Rate Ethernet," LightReading Networking the Telecom Community, http://www.lightreading.com/googlewantsvariablerateethernet/d/did/701991, pp. 1-6.

"Multi-link Gearbox Implementation Agreement" OIF Optical Internetworking Forum, May 2012, pp. 1-18.

Cole, Chris, "MLG (Multi-Link Gearbox) Project Start Proposal," OIF Optical Internetworking Forum, Jul. 8, 2011, pp. 1-13.

Irwin, Scott, "MLG 3.0 Update and Baseline Text," OIF Optical Internetworking Forum, Jul. 28, 2014, Slides 1-13.

"Multi-link Gearbox Implementation Agreement" OIF Optical Internetworking Forum, Apr. 2013, pp. 1-40.

Trowbridge, Stephen J., "Mapping of 100 Gbit/s Ethernet into OTN and the need for a Lane Independent PCS," Alcatel Lucent, Mar. 2007, Slides 1-27.

* cited by examiner

FLEXIBLE ETHERNET AND MULTI LINK GEARBOX MAPPING PROCEDURE TO OPTICAL TRANSPORT NETWORK

CROSS-REFERENCE TO RELATED APPLICATIONS

The present patent/patent application claims priority to U.S. Provisional Patent No. 62/068,315 filed on Oct. 24, 2014 entitled "FLEXIBLE ETHERNET AND MULTI LINK GEARBOX MAPPING PROCEDURE WITH OPTICAL TRANSPORT NETWORK," the contents of which are incorporated by reference herein.

FIELD OF THE DISCLOSURE

The present disclosure relates generally to networking systems and methods. More particularly, the present disclosure relates to a flexible Ethernet mapping and Multi Link Gearbox (MLG) procedure with Optical Transport Network (OTN).

BACKGROUND OF THE DISCLOSURE

Long-Haul Dense Wave Division Multiplexing (DWDM) transport is expected to be the dominant cost and limiting contributor of an end-to-end link for many years to come. There is momentum in the industry to define a flexible end-to-end packet flow with a flexible Ethernet architecture to adapt to line capabilities. A consortium of companies is defining a Physical Coding Sublayer (PCS) layer Flexible Ethernet (FlexE) scheme based on a generalized approach resembling the Optical Internetworking Forum (OIF) Multi Link Gearbox (MLG) extensions utilizing granularity of PCS lanes (e.g., 5 Gb/s) and Physical Medium Dependent (PMD) (e.g., 100GBASE-SR4). For example, this Flexible Ethernet MAC proposal is described by Xiaoxue Zhao et al., "The Prospect of Inter-Data-Center Optical Networks," IEEE Communications Magazine, September 2013, the contents of which are incorporated by reference herein. The FlexE scheme is also referred to as a "shim" PCS function. There are currently no defined and standard schemes for mapping this FlexE to OTN. Transport gear needs to solve this problem in an efficient manner. OIF MLG extensions are described in OIF IA # OIF-MLG-02.0 Multi-link Gearbox Implementation Agreement, April 2013, available online at www.oiforum.com/public/documents/OIF-MLG-02.0pdf, and the contents of which are incorporated by reference herein.

Conventionally, there are two standard mapping procedures that could be applicable to FlexE, namely Optical channel Data Unit (ODU) flex (ODUflex) Constant Bit Rate (CBR) and ODUflex Generic Framing Procedure (GFP). ODUflex(CBR) mapping requires logic to bit-demultiplex, Forward Error Correction (FEC) decode (possibly), align, reorder and deskew PCS Virtual Lanes (VLs) with knowledge of grouping and VL sizes. There could be multiple PCS/FlexE per PMD/port or vice-versa. This is a PCS layer type of mapping in transport gear and has cost/logic associated with the implementation. ODUflex(GFP) mapping requires logic to bit-demultiplex, FEC decode (possibly), align, reorder and deskew PCS VLs, then terminate the PCS coding (64B/66B) with knowledge of groupings to get to packet or MAC layer in order to perform Frame mapped GPF (GFP-F) mapping. There could be multiple FlexE per PMD/port or vice-versa. This is a Media Access Control (MAC)/packet layer type of mapping in transport gear and has significant cost/logic associated with the implementation.

BRIEF SUMMARY OF THE DISCLOSURE

In an exemplary embodiment, a flexible mapping method, implemented in circuitry, is described to map a Physical Coding Sublayer (PCS) structure from Flexible Ethernet and/or Multi Link Gearbox (MLG) to Optical Transport Network (OTN). The flexible mapping method includes receiving one or more Virtual Lanes; and mapping each of the one or more Virtual Lanes into an associated Tributary Slot, wherein a rate and number of the Tributary Slots in OTN is set based on a rate and number of the one or more Virtual Lanes. Remote Management (RM) channels or specific Alignment Markers (AM) can be used to communicate a status of the one or more virtual lanes comprising use, assignment and a number of Virtual Lanes. The Tributary Slots can be in an Optical channel Payload Unit flex (OPUflex) that is mapped into an Optical channel Data Unit flex (ODUflex). The flexible mapping method can further include resizing the ODUflex responsive to a change in a number of the one or more Virtual Lanes. The flexible mapping method can further mapping the associated Tributary Slots into an Optical channel Data Unit flex (ODUflex); performing one of providing the ODUflex to an OTN switch, mapping the ODUflex into an Optical channel Transport Unit k (k=0, 1, 2, 3, 4, flex) or C=100×n (n=1, 2, 3, . . . ) (OTUk/Cn), or aggregating the ODUflex with other signals in the OTUk/Cn. The Virtual Lane can be about 5 Gb/s, and wherein a Payload Type (PT) is defined in OTN designating a Tributary Slot of about 5 Gb/s. The Virtual Lane can be about 25 Gb/s or greater, and wherein a Payload Type (PT) is defined in OTN designating a Tributary Slot of about 25 Gb/s or greater.

In another exemplary embodiment, a transport system is described configured to map a Physical Coding Sublayer (PCS) from Flexible Ethernet and/or Multi Link Gearbox (MLG) to Optical Transport Network (OTN). The transport system includes circuitry configured to receive one or more Virtual Lanes; and circuitry to map each of the one or more Virtual Lanes into an associated Tributary Slot, wherein a rate and number of the Tributary Slots in OTN is set based on a rate and number of the one or more Virtual Lanes. Remote Management (RM) channels or specific Alignment Markers (AM) can be used to communicate a status of the one or more virtual lanes comprising use, assignment and a number of Virtual Lanes. The Tributary Slots can be in an Optical channel Payload Unit flex (OPUflex) that is mapped into an Optical channel Data Unit flex (ODUflex). The transport system can further include circuitry configured to resize the ODUflex responsive to a change in a number of the one or more Virtual Lanes. The transport system transport system can further include circuitry configured to map the associated Tributary Slots into an Optical channel Data Unit flex (ODUflex); and circuity configured to perform one of providing the ODUflex to an OTN switch, mapping the ODUflex into an Optical channel Transport Unit k (k=0, 1, 2, 3, 4, flex) or C=100×n (n=1, 2, 3, . . . ) (OTUk/Cn), or aggregating the ODUflex with other signals in the OTUk/Cn. The Virtual Lane can be about 5 Gb/s, and wherein a Payload Type (PT) is defined in OTN designating a Tributary Slot of about 5 Gb/s. The Virtual Lane can be about 25 Gb/s or greater, and wherein a Payload Type (PT) is defined in OTN designating a Tributary Slot of about 25 Gb/s or greater.

In a further exemplary embodiment, a flexible de-mapping method, implemented in circuitry, is described to de-map Optical Transport Network (OTN) with Tributary Slots to Virtual Lanes for Flexible Ethernet and/or Multi Link Gearbox (MLG). The flexible de-mapping method includes receiving an OTN signal with one or more Tributary Slots contained therein; and de-mapping each of the one or more Tributary Slots to output a Virtual Lane for each of the one or more Tributary Slots, wherein a rate and number of the one or more Tributary Slots in OTN is set based on a rate and number of the Virtual Lane. Remote Management (RM) channels or specific Alignment Markers (AM) are used to communicate a status of the one or more virtual lanes comprising use, assignment and a number of Virtual Lanes. The Tributary Slots can be in an Optical channel Payload Unit flex (OPUflex) that is mapped into an Optical channel Data Unit flex (ODUflex). The Virtual Lane can be about 5 Gb/s, and wherein a Payload Type (PT) is defined in OTN designating a Tributary Slot of about 5 Gb/s. The Virtual Lane can be about 25 Gb/s or greater, and wherein a Payload Type (PT) is defined in OTN designating a Tributary Slot of about 25 Gb/s or greater. The flexible de-mapping method can further include providing each of the Virtual Lanes to a router.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, a flexible Ethernet mapping process into OTN is described, which may be referred to as an ODUflex(MLG) (Multi Link Gearbox) or ODUflex(FlexE) mapping procedure, to support mapping into right-sized ODUflex connections. The flexible Ethernet mapping process maps the generalized MLG-style group of lanes (virtual PHYs/PMDs) into an OPUflex Tributary Slot (TS) structure, keeping PCS structures intact, and creates a single ODUflex container with a matching rate of FlexE for end-to-end flow. The ODUflex signal can be switched and multiplexed in OTN transport equipment and the like. Advantageously, the flexible Ethernet mapping process does not require alignment, reorder and deskewing of PCS lanes. This provides an efficient mechanism for equipment vendors and network operators to address the complexities with mapping FlexE shim PCS into flexible OTN containers. The flexible Ethernet mapping process can be implemented on client cards or the like, and work in conjunction with an OTN switch and/or flexible line technologies, i.e. optical modems. Advantageously, the flexible Ethernet mapping process reduces the complexity of mapping FlexE into OTN (relative to GFP-F, etc.). It allows the FlexE to be carried either by multiple fixed capacity optical links or by flexibly sized optical links. An exemplary objective of the flexible Ethernet mapping process is to efficiently couple flexible Network Processing Units (NPUs) with Next-Gen DWDM modems, and to avoid PAUSE frames between router and transport equipment.

In an exemplary embodiment, the present disclosure maps/demaps Virtual Lanes (VLs) from MLG or the like directly into Tributary Slots (TSs) in ODUflex/OPUflex. This one-to-one correspondence between VLs (or PCS lanes) and TSs provides a simple and scalable mapping method in OTN for flexible traffic such as MLG, FlexE, etc. Accordingly, a Payload Type (PT) in OTN can be adjusted for specific TS rates based on the corresponding VL rates. For example, currently in MLG1.0/2.0, the VL rate is 5 Gb/s, so OTN can be adjusted with a new PT supporting 5 Gb/s. Future implementations and the like may include VL rates at 25 Gb/s or greater, and here, OTN can be updated to include a new PT supporting 25 Gb/s or greater. Accordingly, each VL is accorded its own TS in OTN, and vice versa. Again, this method is simple, efficient and less complex than ODUflex(CBR) or ODUflex(GFP). This mapping procedure can be referred to as an ODUflex(MLG) or ODUflex(FlexE) mapping procedure. The mapping between VLs and TSs can use the Bit-synchronous Mapping Procedure (BMP) in OTN.

Figure 1A:
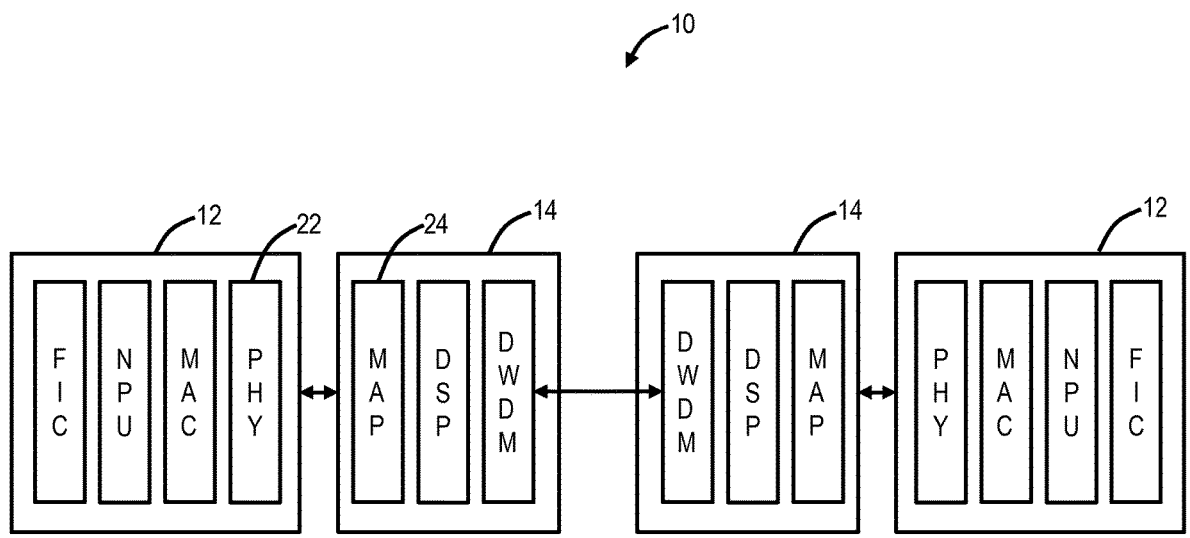
FIGS. 1A-1B are functional block diagrams of a network topology and building blocks.
Figure 1B:
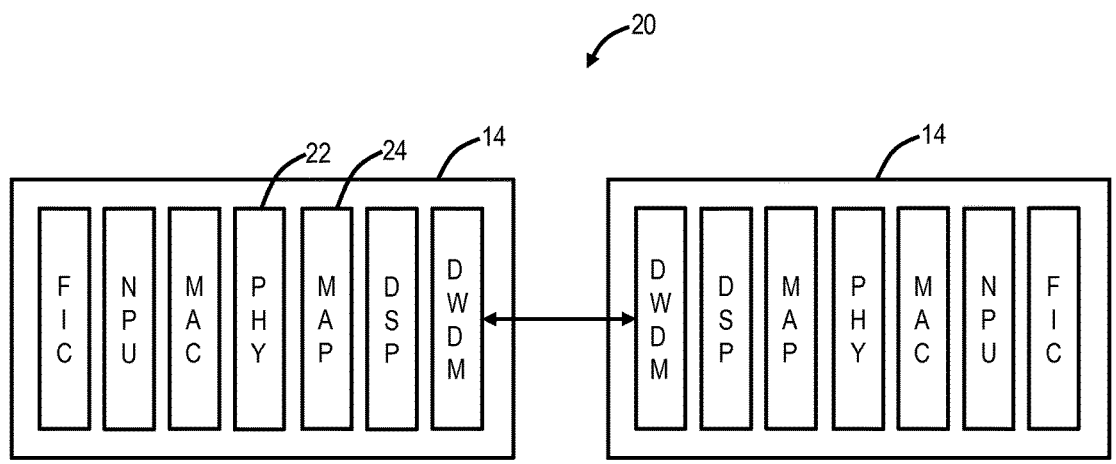

Referring to FIGS. 1A-1B, in an exemplary embodiment, functional block diagrams illustrate a network topology and building blocks. Specifically, in FIG. 1A, a topology 10 is shown for router (R) 12 to router (R) 12 interconnectivity with intermediate transport equipment (T) 14, i.e. R-T-T-R, and a topology 20 is for router (R) 12 to router (R) 12 direct interconnectivity, i.e. R-R. Functionally, the router 12 includes a Fabric Interface Chip (FIC), Network Processor (NPU), Media Access Control (MAC), and a Physical Layer Interface (PHY) 22. In FIG. 1A, the transport equipment (T) 14 includes a mapping/demapping circuitry 24, Digital Signal Processing (DSP), and a DWDM modem. In FIG. 1B, the corresponding components for the transport equipment (T) 14 are included directly in the router (R) 12, without the transport equipment (T) 14 as a separate network element.

The DWDM modem can support various different baud rates through software-programmable modulation formats. The DWDM modem can support programmable modulation, or constellations with both varying phase and/or amplitude. In an exemplary embodiment, the DWDM modem can support multiple coherent modulation formats such as, for example, i) dual-channel, dual-polarization (DP) binary phase-shift keying (BPSK) for 100 G at submarine distances, ii) DP quadrature phase-shift keying (QPSK) for 100 G at ultra long haul distances, iii) 16-quadrature amplitude modulation (QAM) for 200 G at metro to regional (600 km) distances), or iv) dual-channel 16 QAM for 400 G at metro to regional distances. Thus, in this exemplary embodiment, the same DWDM modem hardware can support 100 G to 400 G. With associated digital signal processing (DSP) in the DWDM modem hardware, moving from one modulation format to another can be completely software-programmable. In another exemplary embodiment, the DWDM modem can support N-QAM modulation formats with and without dual-channel and dual-polarization where N can even be a real number and not necessarily an integer. Here, the DWDM modem can support non-standard speeds since N can be a real number as opposed to an integer, i.e. not just 100 G, 200 G, or 400 G, but variable speeds, such as 130 G, 270 G, 560 G, etc. Furthermore, with the DSP and software programming, the capacity of the DWDM modem can be adjusted upwards or downwards in a hitless manner so as to not affect the guaranteed rate. Variously, the flexible Ethernet mapping process involves mapping and demapping between the Physical Layer Interface (PHY) 22 and the mapping/demapping circuitry 24, ultimately for transmission via the DWDM modem.

Figure 2A:
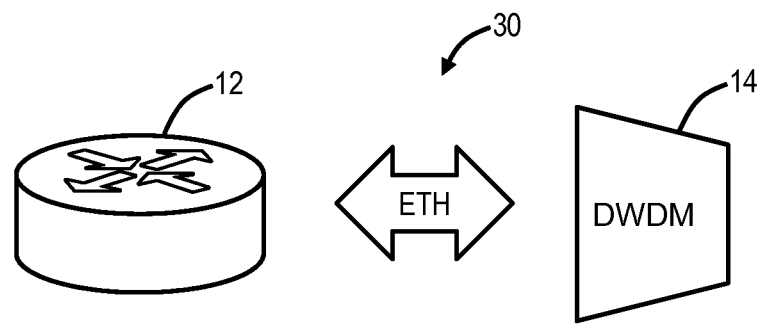
FIGS. 2A-2D are block diagrams of different options for flexible Ethernet mapping between the router (R) and the transport equipment (T)

Referring to FIGS. 2A-2D, in various exemplary embodiments, block diagrams illustrate different options for Ethernet mapping 30, 32, 34, 36 between the router (R) 12 and the transport equipment (T) 14. Note, as described herein, the flexible Ethernet mapping between the router (R) 12 and the transport equipment (T) 14 is between the Physical Layer Interface (PHY) 22 and the mapping/demapping circuitry 24. FIG. 2A illustrates sub-rate grooming for the Ethernet mapping 30. Here, there is a partially filled standard rate PHY 22 for the router, e.g. 400GBASE-SR4 with 250 G of traffic. At the mapping/demapping circuitry 24, the packet mapping is performed in a right-sized ODUflex(GFP), so only 250 G is transported by the DWDM modem. However, the Ethernet mapping 30 is wasteful for the router ports and the NPU, requires higher rates for the PHY 22, requires packet mapping capabilities in the transport equipment and some buffering, etc. Also, the Ethernet mapping 30 requires flow-control or throttling such as through PAUSE frames.

Figure 2B:
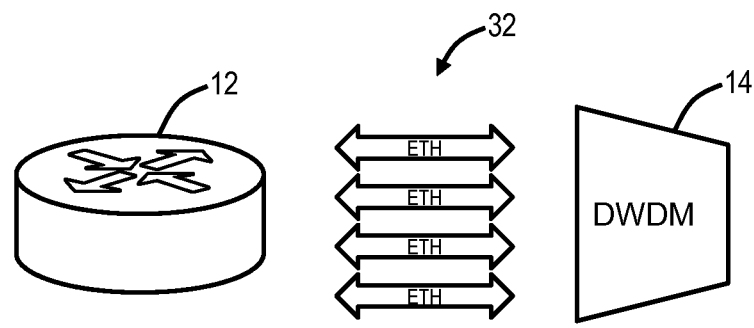

FIG. 2B illustrates super-rate bonding for the Ethernet mapping 32. This is similar to Link Aggregation Group (LAG), but performed at the PCS (flexE shim) PHYs 22. Here there are multiple standard rate PHYs 22 on the router 12 and the transport equipment 14 can perform CBR mappings to individual ODUk for each of the standard rate PHYs 22. The Ethernet mapping 32 does user smaller PHY containers (e.g. 10 G, 25 G, 40 G, etc.), but is not dynamic and does require deskew.

Figure 2C:
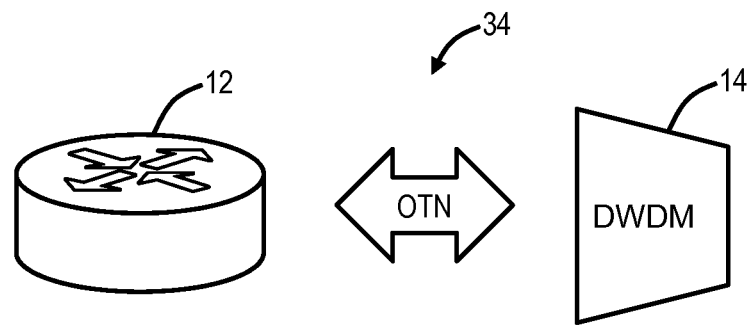

FIG. 2C illustrates an approach with OTN in the routers 12 for the Ethernet mapping 34. Here, the PHY 22 in the router is a channelized OTN router port (e.g. OTUC4) and the transport equipment 14 can directly provide the channelized OTN router port to the DWDM modem. This could use ODUflex(GFP) to replace the Ethernet PCS. However, one major drawback of this approach is that the routers 12 do not currently have channelized OTN capabilities, and requiring this capability is likely to push too much cost onto the router 12.

Figure 2D:
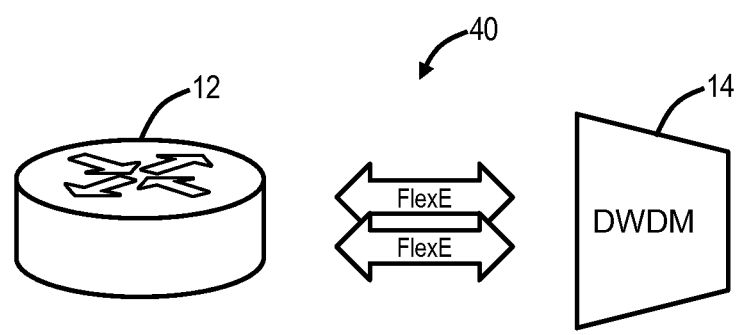

FIG. 2D illustrates an approach using an generalized MLG extension for the flexible Ethernet mapping 40. Here, the router 12 has channelized router ports for the PHY 22 (e.g., 5 Gb/s, 25 Gb/s, etc.) and they are provided to the transport equipment 14. Again, OIF MLG extensions are described in OIF IA # OIF-MLG-02.0 Multi-link Gearbox Implementation Agreement, April 2013, available online at www.oiforum.com/public/documents/OIF-MLG-02.0.pdf, and the contents of which are incorporated by reference herein. Advantageously, the routers 12 already have some MLG capabilities to create MLG channelized router ports.

FlexE is proposing a scheme where a packet flow gets mapped and distributed (i.e. MLD or calendar/scheduler style) over n standard-rate PCS and then these can get mapped to m VL and PMDs. The interface to transport gear is typically standard rate PMDs and gray optics (i.e. 100GBASE-SR4) which is channelized.

The flexible Ethernet mapping 40 process described herein contemplates channelized router ports utilizing generalized MLG-style capabilities with standard PHY/PMD rate channels. This is channelization, sub-rate and super-rate (bonding) all in one; similar to an MLG approach.

Figure 2E:
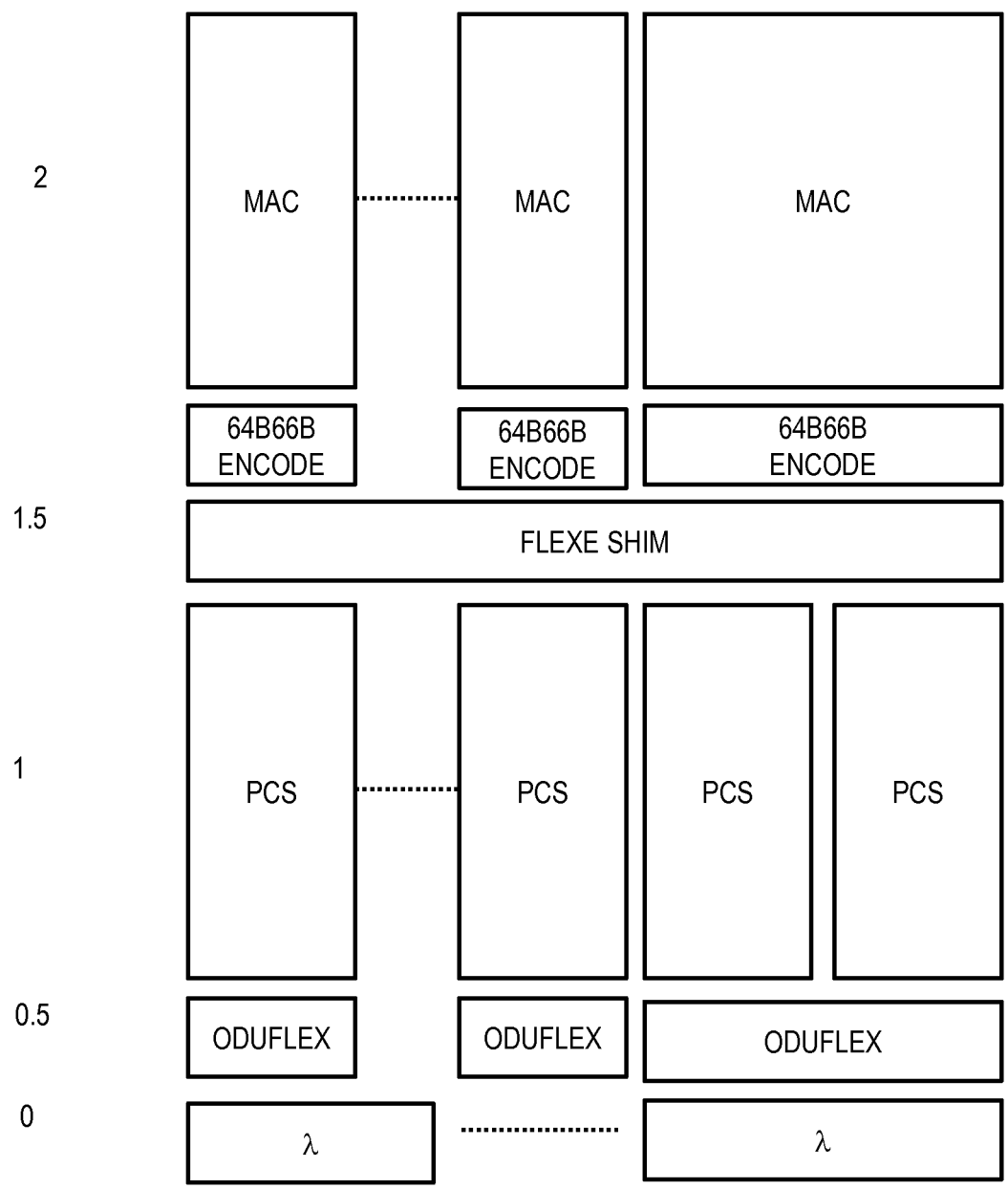
FIG. 2E is a logical diagram of Layers 2-0 of the OSI stack in reference to the flexible Ethernet shim and mapping processes described herein.

Referring to FIG. 2E, in an exemplary embodiment, a logical diagram illustrates Layers 2-0 of the OSI stack in reference to the flexible Ethernet mapping processes described herein. Here, Layer 2 traffic (MAC) is 64 B/66 B encoded into a FlexE Shim layer which is broken down into single or multiple PCS at layer 1, mapped to ODUflex and provided on a wavelength.

Figure 3:
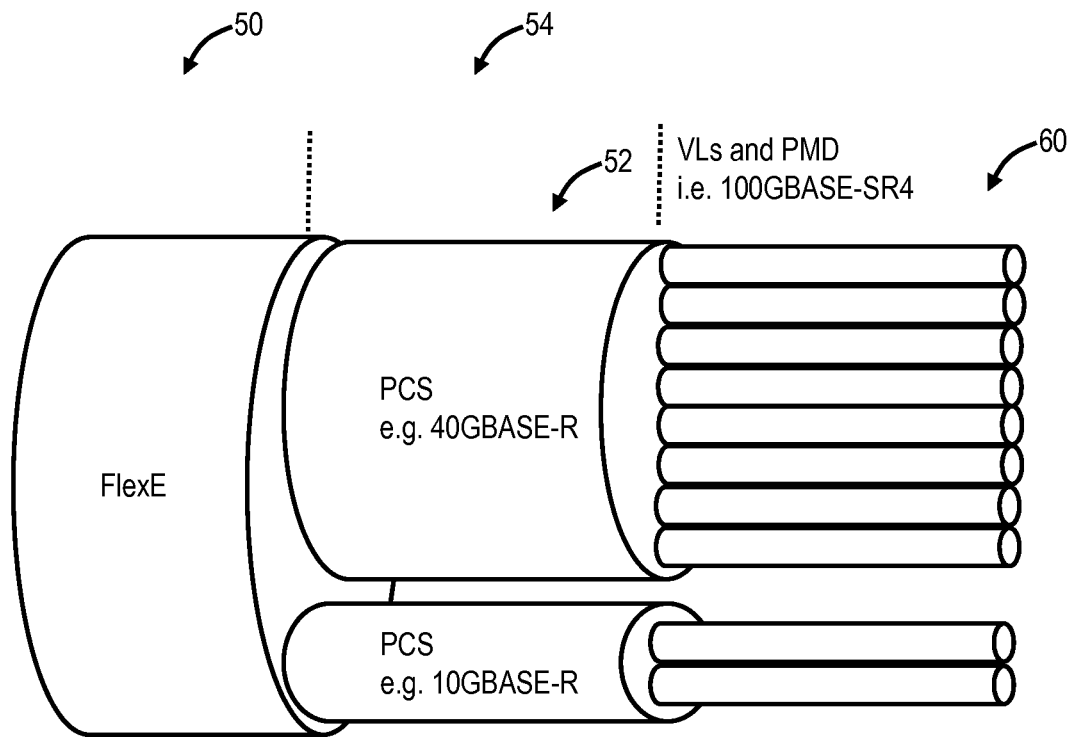
FIG. 3 is a logical diagram of a FlexE (e.g., 50 Gb/s) with generalized MLG-style capabilities.

Referring to FIG. 3, in an exemplary embodiment, a block diagram illustrates an exemplary FlexE 50 (e.g., assume 50 Gb/s for illustration purposes) with generalized MLG-style capabilities. Here, there is a scheduler (or TDM structure) or FlexE frame based distribution to PMD 52 with standard Ethernet PCS layers 52 (e.g., 10GBASE-R+40GBASE-R) to VLs and PMD (e.g., 100G-BASE-SR). For example, MLG2.0 can already stripe 40G across 2×100 G PHYs, such as to support 5×40 G. This can use the MLD type of scheme to distribute single packet flow across different virtual channels/PHYs, using 64b66b word boundaries and calendar based scheduler, or FlexE fixed frame format. MLG utilizes Virtual Lanes (VLs) 60. Again, in MLG 1.0/2.0, a rate of the VLs 60 is ~5 Gb/s each. The VLs 60 can support higher rates as well, such as ~25 Gb/s. The flexible Ethernet mapping process contemplates any rate for the VLs 60.

Figure 4:
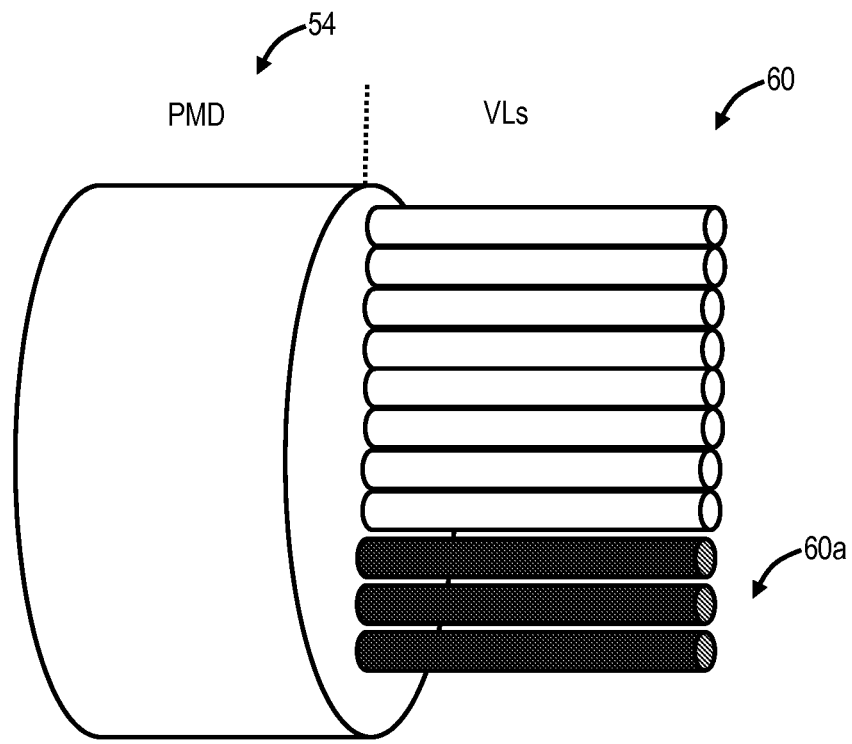
FIG. 4 is a block diagram of PMD and used/unused VL structure.

Referring to FIG. 4, in an exemplary embodiment, a block diagram illustrates PMD 54 and VL 60 interconnections. That is, the PMD 54 includes a plurality of VLs 60. MLG 3.0 proposes to extend the MLG 1.0/2.0 to support Monitor and Control, as well as define IEEE 802.3bj RS-FEC compatibility. Specifically, the Monitor and Control in MLG 3.0 will allow Remote Management (RM) channels or specific Alignment Markers (AM) to communicate a status of the VLs 60. In this manner, the status of the VLs 60 can be communicated. For example, VLs 60*a* may be unused or Open Connection Indication (OCI), meaning the VLs 60*a* are not used. The flexible Ethernet mapping process contemplates using similar MLG3.0 RMs or specific AM to indicate OCI/unused on the VLs 60, 60*a* which can be used to communicate transport capabilities from the transport equipment 14 to the router 12 or traffic capacity from the router 12 to the transport equipment 14.

Figure 5:
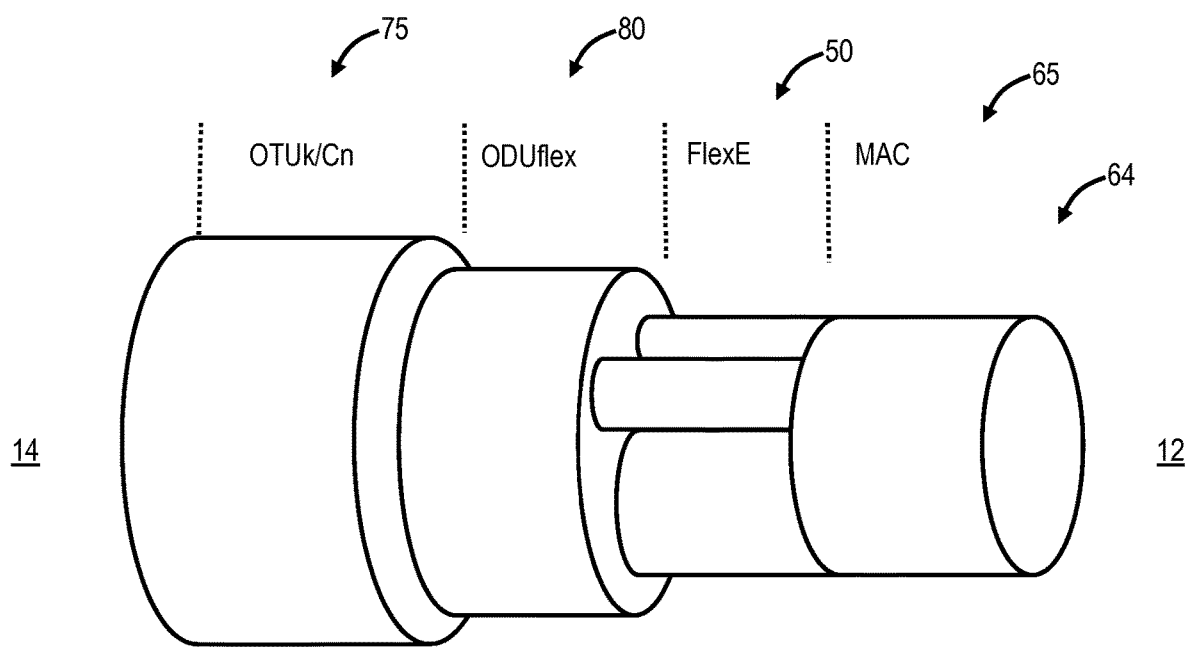
FIG. 5 is a logical diagram of a flexible Ethernet mapping process where FlexE from a router where associated VLs/PMDs are mapped together into a single ODUflex container.

Referring to FIG. 5, in an exemplary embodiment, a logical diagram illustrates a flexible Ethernet mapping process 64. The logical diagram in FIG. 5 is bidirectional between the transport equipment 14, which utilizes OTN, and the router 12, which utilizes Ethernet (packets). The flexible Ethernet mapping process 64 uses MLG on the router 12. In FIG. 5, the flexible Ethernet mapping process 64 includes MAC 65 from the router 12 with FlexE 50 where associated VLs are mapped together into a single ODUflex container 80. In an exemplary embodiment, the flexible Ethernet mapping process 64 presents a new way to map grouped virtual PHYs (the VLs 60) into a single ODUflex container where the transport gear does not add to skew between the virtual PHYs in the FlexE.

Note, in FIG. 5, the ODUflex container 80 can be mapped into an Optical channel Transport Unit k (k=0, 1, 2, 3, 4, flex) or C=100×n (n=1, 2, 3, . . . ) (OTUk/Cn) 75, for transport by the modem.

In an exemplary embodiment, the flexible Ethernet mapping process 64 maps/demaps the Virtual Lanes (VLs) 60 from FlexE 50 or the like directly into Tributary Slots (TSs) in ODUflex 80. This one-to-one correspondence between VLs and TSs provides a simple and scalable mapping method in OTN for flexible traffic such as MLG, FlexE, etc. Accordingly, a Payload Type (PT) in OTN can be adjusted for specific TS rates based on the corresponding VL rates. For example, currently in MLG1.0/2.0, the VL rate is 5 Gb/s, so OTN can be adjusted with a new PT supporting 5 Gb/s. Future MLG implementations and the like may include VL rates at 25 Gb/s or beyond, and here, OTN can be updated to include a new PT supporting these greater sizes. Accordingly, each VL is accorded its own TS in OTN, and vice versa. Again, this method is simple and efficient and less complex than ODUflex(CBR) or ODUflex(GFP). This mapping procedure can be referred to as an ODUflex(MLG) or ODUflex(FlexE) mapping procedure. The mapping between VLs and TSs can use the Bit-synchronous Mapping Procedure (BMP) in OTN.

Figure 6:
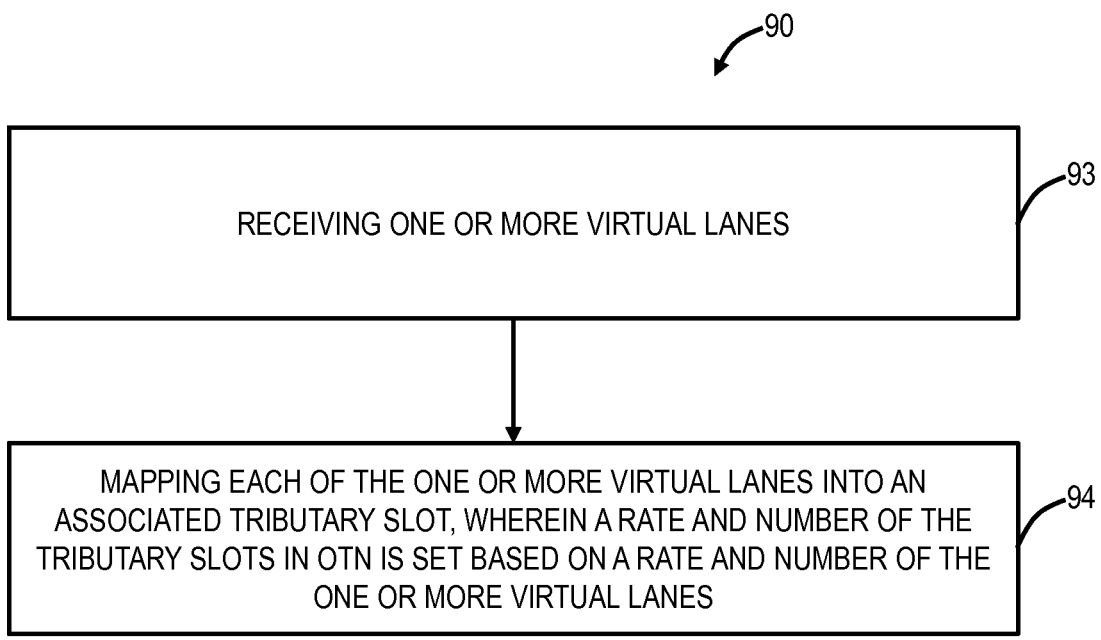
FIGS. 6 and 7 are flow charts illustrate a flexible mapping method (FIG. 6) and a flexible de-mapping method (FIG. 7) to map/de-map Virtual Lanes from Flexible Ethernet and/or Multi Link Gearbox (MLG) to/from Optical Transport Network (OTN)
Figure 7:
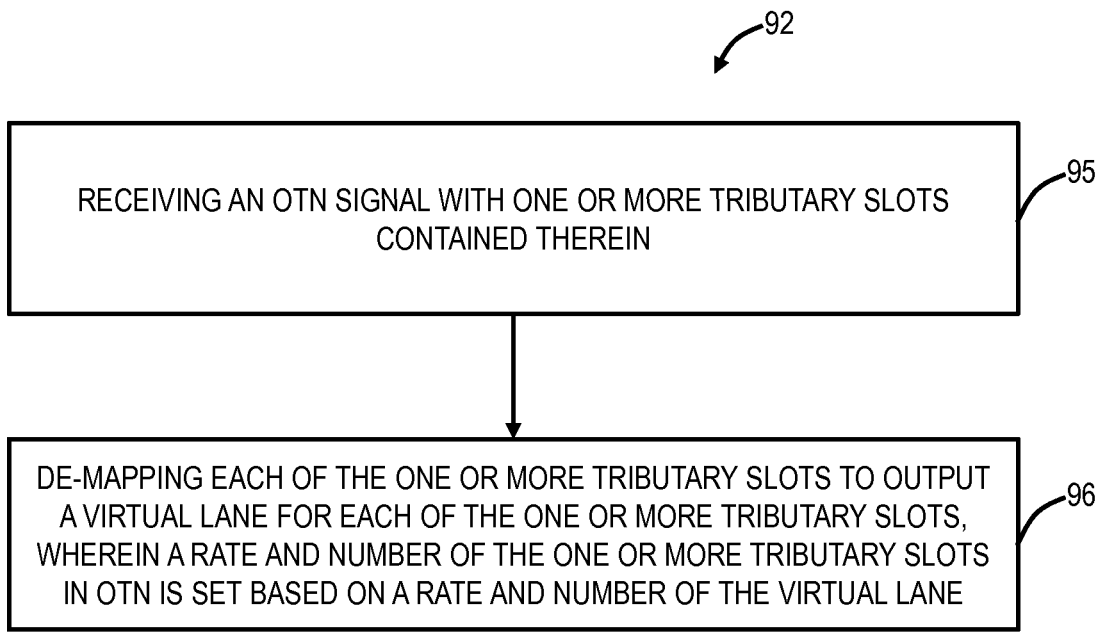

Referring to FIGS. 6 and 7, in exemplary embodiments, flow charts illustrate a flexible mapping method 90 and a flexible de-mapping method 92 to map/de-map Virtual Lanes from Flexible Ethernet and/or Multi Link Gearbox (MLG) to/from Optical Transport Network (OTN). The methods 90, 92 contemplate implementation in circuitry such as an Application Specific Integrated Circuit (ASIC), Field Programmable Gate Array (FPGA), or other types of logic circuitry included a combination of various different types. The methods 90, 92 provide additional details for the flexible Ethernet mapping process 64. In FIG. 6, the flexible mapping method 90 includes receiving one or more Virtual Lanes (step 93); and mapping each of the one or more Virtual Lanes into an associated Tributary Slot, wherein a rate and number of the Tributary Slots in OTN is set based on a rate and number of the one or more Virtual Lanes (step 94). Remote Management (RM) channels or specific Alignment Markers (AM) can be used to communicate a status of the one or more Virtual Lanes between the router 12 and the transport equipment 14. In FIG. 7, the flexible de-mapping method 92 includes receiving an OTN signal with one or more Tributary Slots contained therein (step 95); and de-mapping each of the one or more Tributary Slots to output a Virtual Lane for each of the one or more Tributary Slots, wherein a rate and number of the one or more Tributary Slots in OTN is set based on a rate and number of the Virtual Lane (step 96). Again, Remote Management (RM) channels or specific Alignment Markers (AM) can be used to communicate a status of one or more Virtual Lanes associated with the one or more Tributary Slots.

The flexible Ethernet mapping process 64 proposes to map each VL 60 into a single TS in an ODUflex. In this manner, a single ODUflex can transport the entire FlexE signal, with variable rate at the ODUflex. There is a one-to-one correspondence between VLs and TSs. One modification is proposed in OTN, namely defining new TSs that are sized appropriately for the VLs, such as 5 G, 25 G, etc. TSs. That is, a new PT is proposed in OTN to signify a TS with a rate based on the rate of the VL and flexible amount of TS, e.g. Payload Type (PT)=0x?? where ?? are to be defined.

Figure 8:
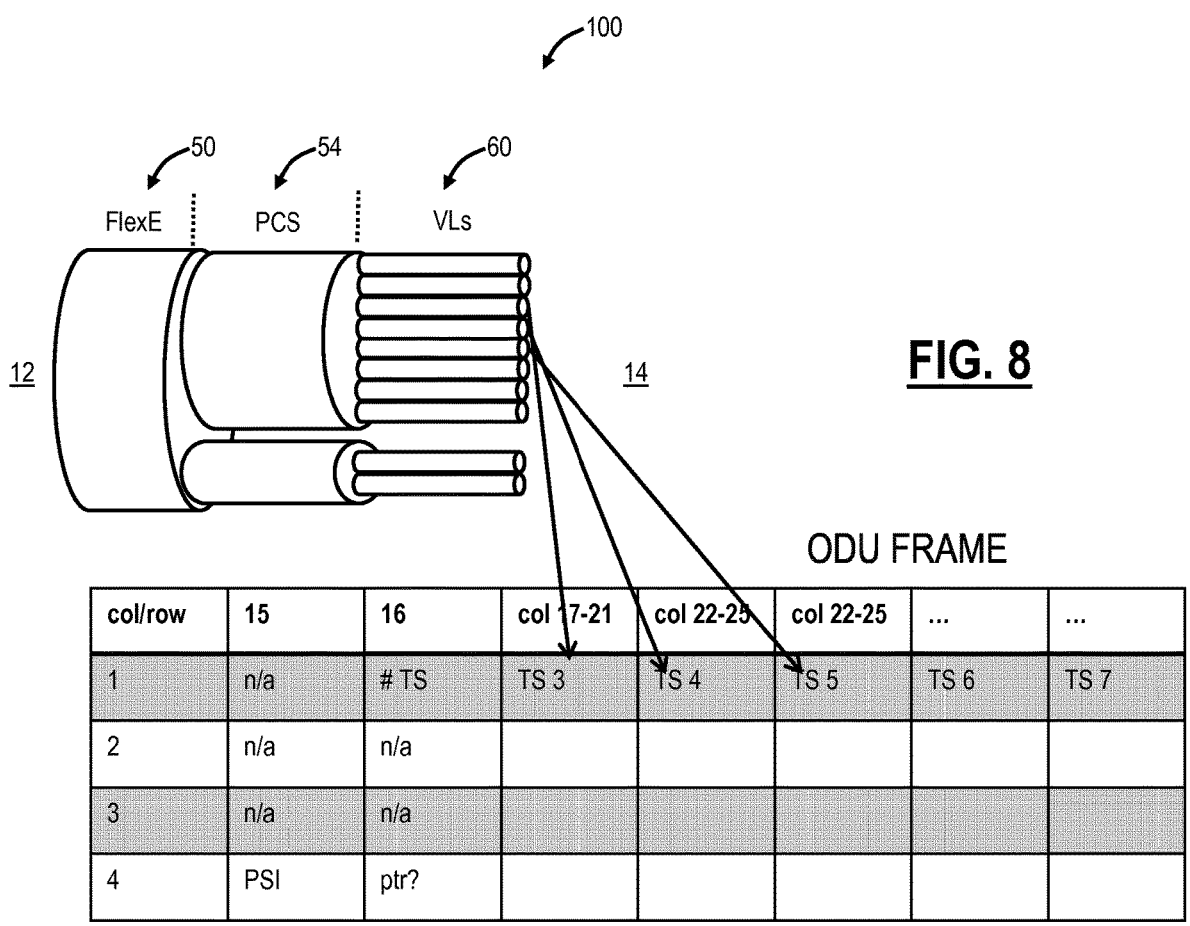
FIG. 8 is a logical diagram of a process illustrating an example for the flexible Ethernet mapping process of FIG. 6 and the methods of FIGS. 6 and 7 of mapping FlexE to OTN.

Referring to FIG. 8, in an exemplary embodiment, a logical diagram illustrates a process 100 as an example for the flexible Ethernet mapping process 64 and the methods 90, 92 of mapping FlexE to OTN. Specifically, the process 100 describes mapping from the router 12 to the transport equipment 14.

For the VLs 60, the process 100 includes bit-demux (possibly) and mapping individual VLs to OPUflex(FlexE) TS 5.1562G (step 106). That is, each VL 60 is mapped to a corresponding TS, e.g. 5.1562G TS. This mapping is shown, for example, in FIG. 8, where VLs 60 are mapped to TS3, TS4, TS5, etc. of an OPUflex (which is part of an ODUflex frame). The IEEE 802.3bj FEC from the MLG is terminated, and transdecode back to 64B66B.

Thus, in various exemplary embodiments, an ODUflex (MLG) structure is proposed which can include:
Rate based on n*5.15625G/25.78125G*239/238
BMP and synchronous to PMD(s)
Multiplexed structure with 5 G/25 G sized TS, but the number of these varies
Payload Type (PT)=0x??—a new PT is proposed in OTN to signify a TS with a rate based on the rate of the VL and flexible amount of TS
4-byte interleaved TS structure
TS number not tied to frame and can roll around
Payload Structure Identifier (PSI) at Multiframe alignment signal (MFAS)=0 for PT
PSI at MFAS=1 or JC1 for number of TS
PSI at MFAS=2 points or NJO to first TS #

Figures 9A, 9B:
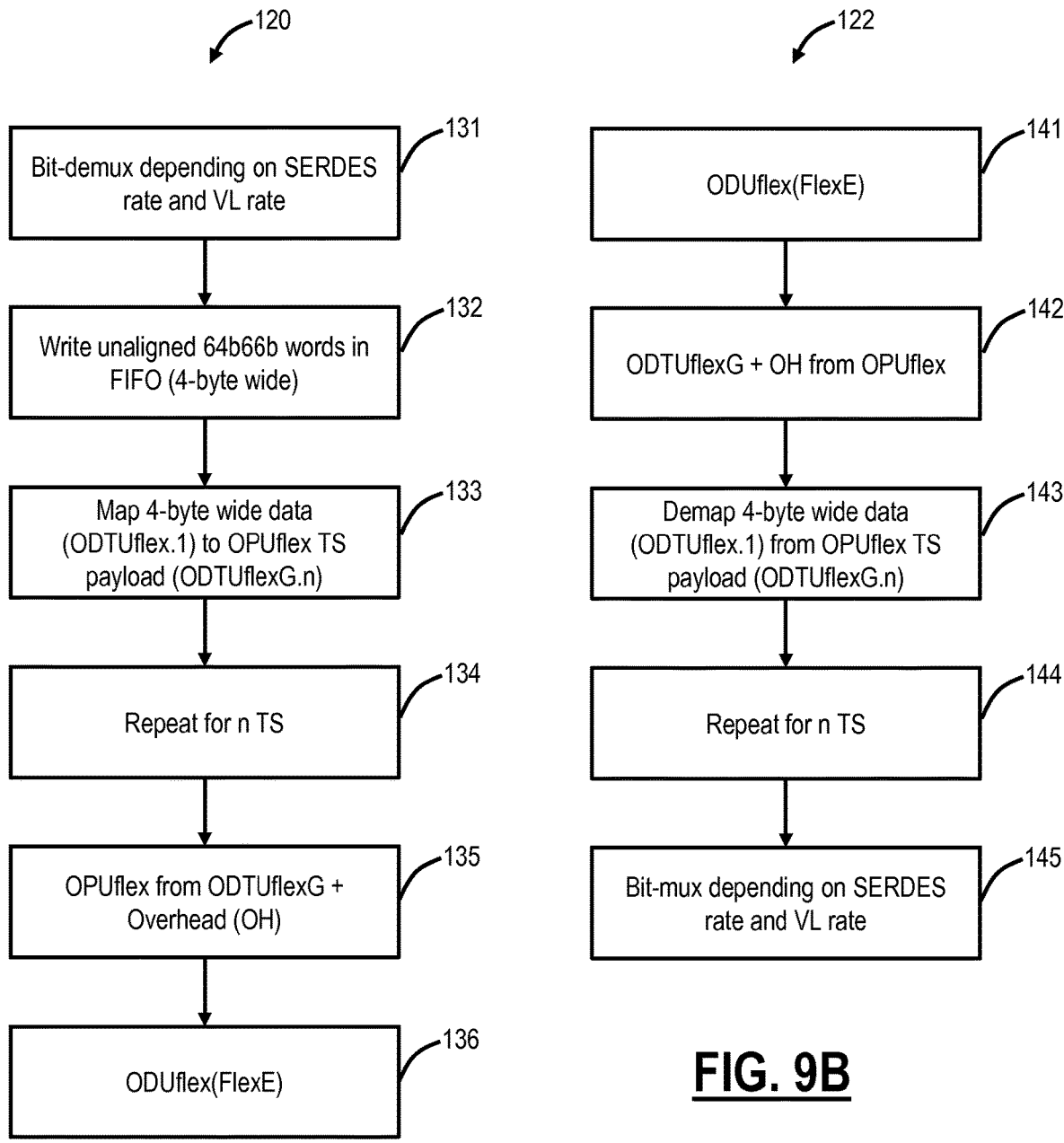
FIGS. 9A and 9B are flow charts of a mapping method and a de-mapping method for the flexible Ethernet mapping process.

Referring to FIGS. 9A and 9B, in exemplary embodiments, flow charts illustrate a mapping method 120 and a de-mapping method 122 for the flexible Ethernet mapping process. The mapping method 120 includes a bit-demultiplexing depending on a Serializer-Deserializer (SERDES) rate and VL rate (step 131), writing unaligned 64B66B words in a First-In-First-Out (FIFO) buffer (e.g., 4-byte wide) (step 132), mapping n-byte wide data (ODTUflex.1) to an OPUflex TS payload (ODTUflexG.n) (step 133), repeating for n TSs (step 134), creating an OPUflex from ODTUflexG+Overhead (OH) (step 135), and providing an ODUflex(FlexE) as an output, such as to the modem (step 136).

The de-mapping method 122 includes receiving an ODUflex(FlexE), such as from the modem (step 141), creating an ODTUflexG +OH from OPUflex (step 142), de-mapping n-byte wide data (ODTUflex.1) from OPUflex TS payload (ODTUflexG.n) (step 143), repeating for n TSs (step 144), and bit-multiplexing depending on SERDES rate and VL rate (step 145).

Note, the flexible Ethernet mapping process does not need to be aware of PCS type (i.e. 100GBASE-R vs 40GBASE-R) or AM/RM markers. Performance monitoring can be done independent of this and may not be required depending on application. VL BIP8 or FEC measured error-rate (using AMs) could be used for monitoring the PCS.

Figure 10:
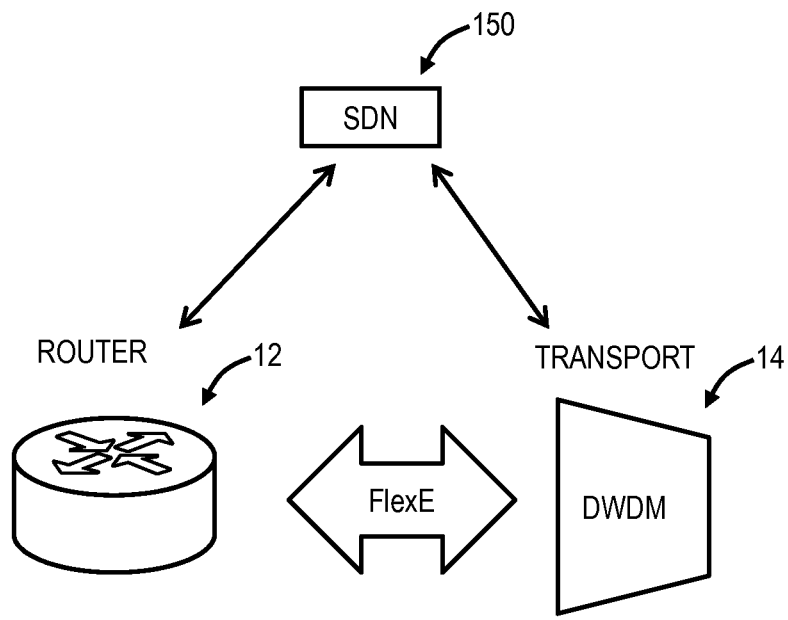
FIG. 10 is a block diagram of a router and transport equipment implementing the flexible Ethernet mapping process, along with a Software Defined Networking (SDN) controller or the like for dynamic resizing.

Referring to FIG. 10, in an exemplary embodiment, a block diagram illustrates a router 12 and transport equipment 14 implementing the flexible Ethernet mapping process, along with a Software Defined Networking (SDN) controller 150 or the like for dynamic resizing. Those of ordinary skill in the art will recognize ODUflex is configured to various types of in-service, dynamic resizing. For example, one such technique is described in G.7044/Y.1347 (formerly G.HAO) (10/11) Hitless Adjustment of ODUflex, the contents of which are incorporated by reference herein. Various other techniques are described in commonly-assigned U.S. patent Ser. No. 14/489,589, filed Sep. 19, 2014, and entitled "ODUFLEX RESIZING SYSTEMS AND METHODS," the contents of which are incorporated by reference herein.

With the flexible Ethernet mapping process, the ODUflex container, carrying VLs as TS, will utilize no more bandwidth than is required on the transport equipment 14, while providing flexibility to dynamically resize as needed by the router 12. This can be through signaling from the SDN controller 150, control plane signaling, or through the Management Communications Channel (MCC). For example, the resizing could be controlled by transport capability advertised to up to SDN by the transport equipment 14, traffic demands communicated via the router 12, or a flexible rate configuration pushed down from the SDN controller 150 to the router 12 and the transport equipment 14. Note, MLG3.0 adds the MCC which can be used as communication channel for resizing along with the various ODUflex resizing techniques described above.

Figure 11:
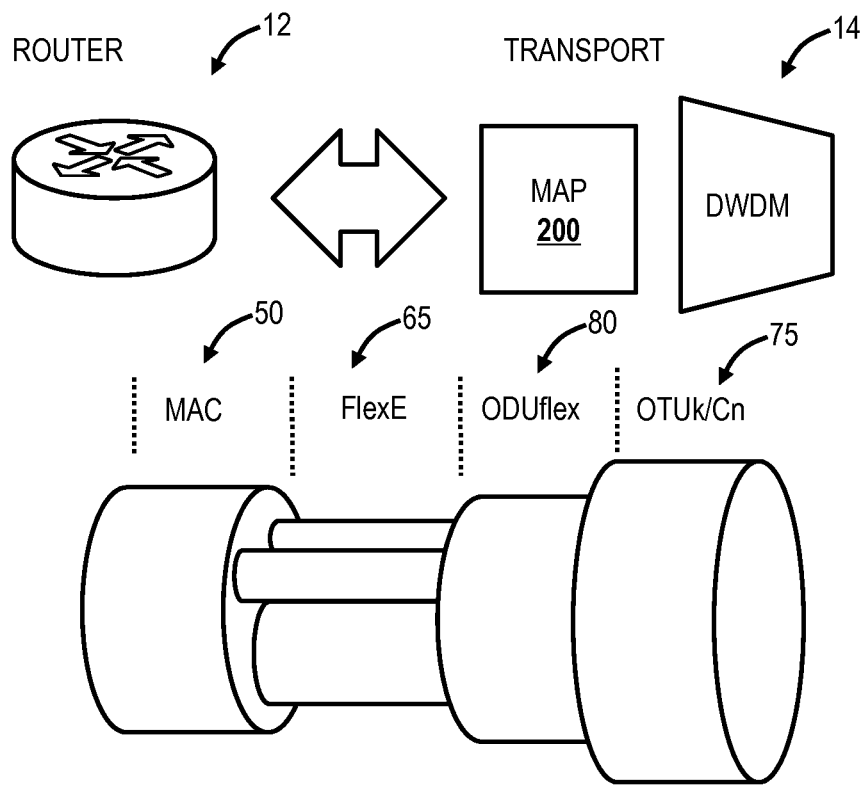
FIG. 11 is a network and logical diagram of an application of the flexible Ethernet mapping process, namely a "fat pipe" configuration between the router and the transport equipment.

Referring to FIG. 11, in an exemplary embodiment, a network and logical diagram illustrates an application of the flexible Ethernet mapping process, namely a "fat pipe" configuration between the router 12 and the transport equipment 14. Here, the router 12 has a single, large MAC 65, with the FlexE Interface 50, to the transport equipment 14. The transport equipment 14 can include a mapper/demapper 200 to implement the various processes described herein, to map the VLs from the router 12 to TSs in an ODUflex.

Figure 12:
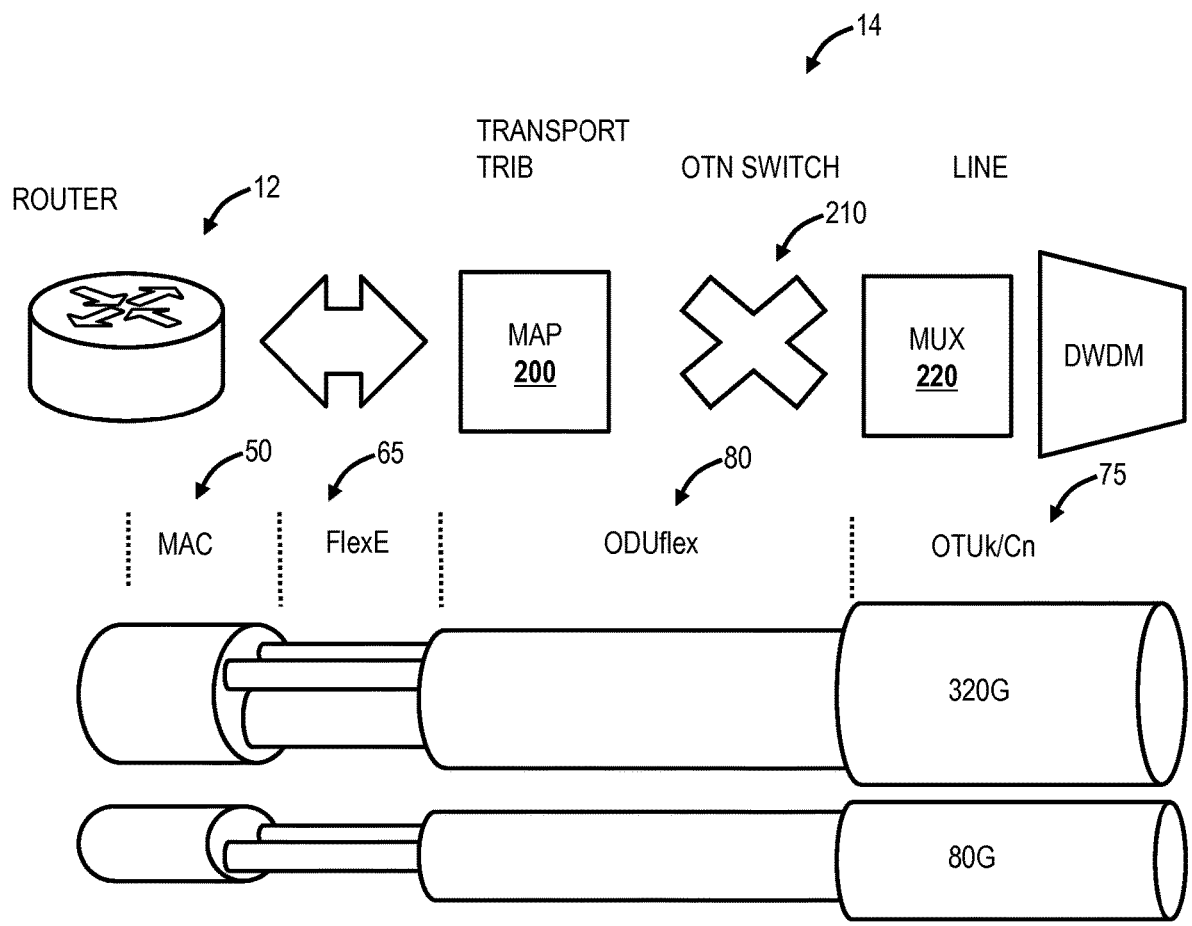
FIG. 12 is a network and logical diagram of another application of the flexible Ethernet mapping process, namely an OTN switching application.

Referring to FIG. 12, in an exemplary embodiment, a network and logical diagram illustrates another application of the flexible Ethernet mapping process, namely an OTN switching application. Here, the MAC 65 can be a 400 G router port, split between 320 G and 80 G, each being mapped via the mapper/demapper 200 into the ODUflex 80 and switched with an OTN switch 210 and multiplexed with a multiplexer 220 into the OTUk/Cn 75.

Figure 13:
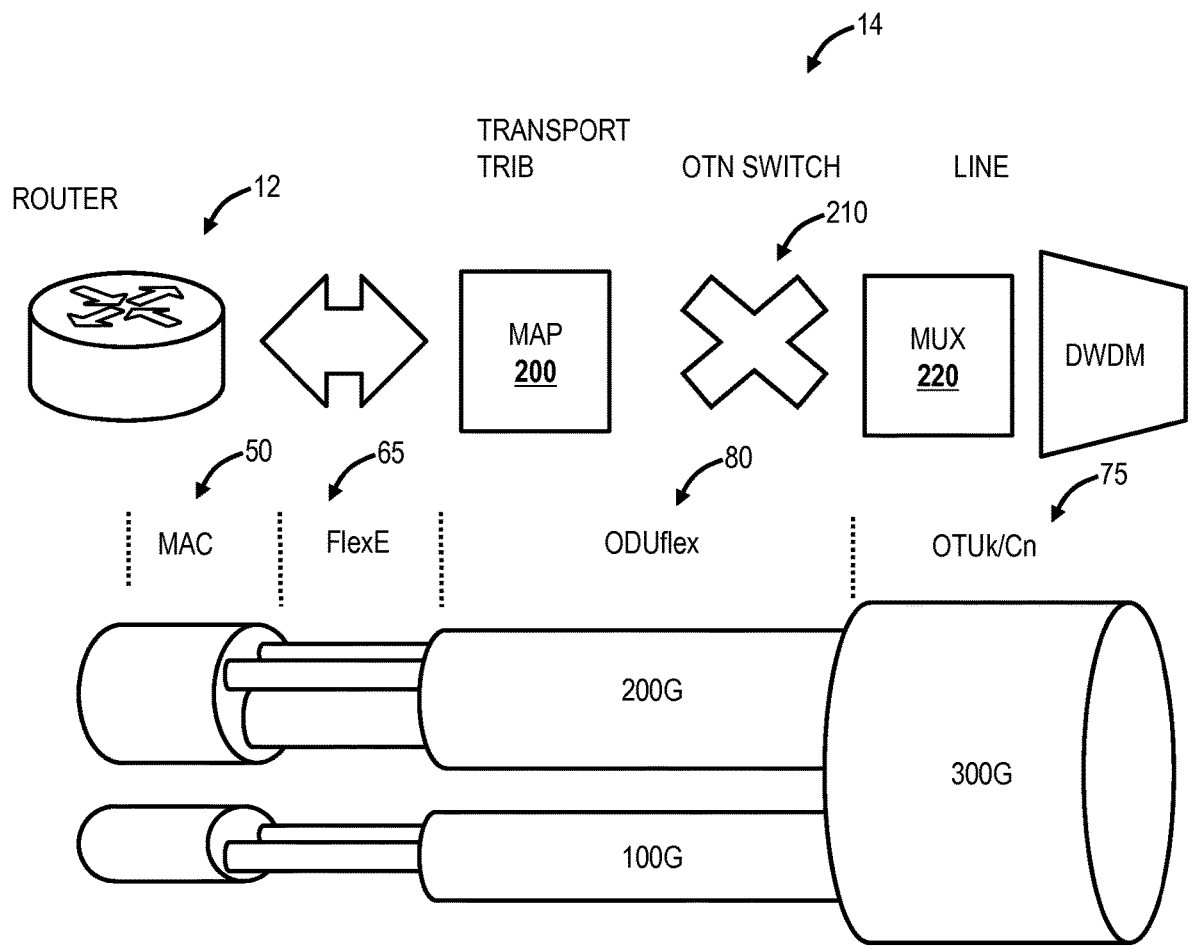
FIG. 13 is a network and logical diagram of another application of the flexible Ethernet mapping process, namely an OTN switching application with Low Order aggregation onto a DWDM line.

Referring to FIG. 13, in an exemplary embodiment, a network and logical diagram illustrates another application of the flexible Ethernet mapping process, namely an OTN switching application with Low Order aggregation onto a DWDM line. Here, there are two router ports, 200 G and 100 G that are mapped to the ODUflex, which in turn, is aggregated into a single OTUk/Cn.

Figure 14:
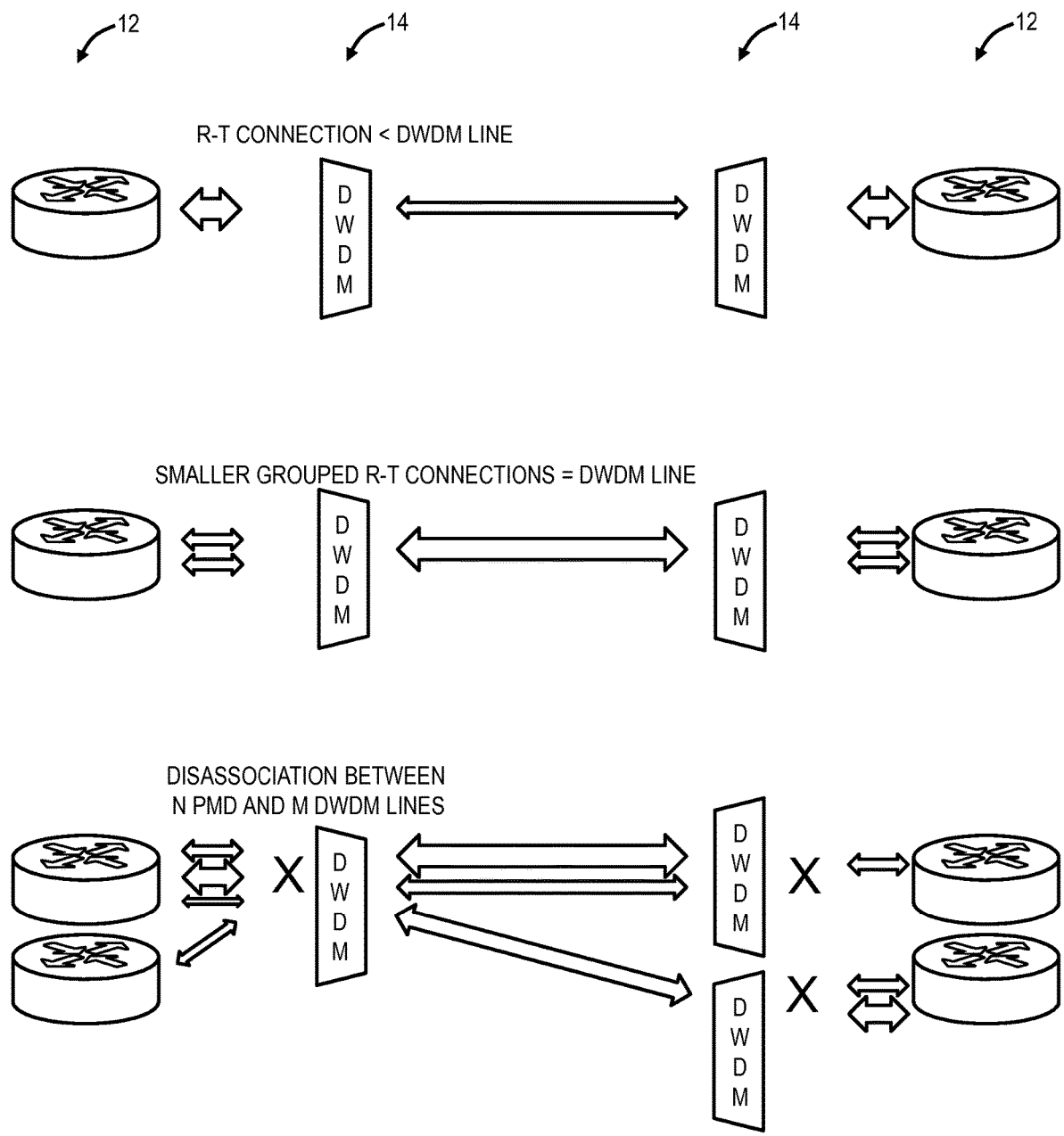
FIG. 14 is network diagrams of various use cases for the flexible Ethernet mapping process.

Referring to FIG. 14, in an exemplary embodiment, network diagrams illustrate various use cases for the flexible Ethernet mapping process. In one exemplary embodiment, the flexible Ethernet mapping process provides a router-to-transport equipment connection that is lower rate than the overall DWDM line. In another exemplary embodiment, the flexible Ethernet mapping process provides smaller grouped router-to-transport equipment connections equal to the DWDM line. In a further exemplary embodiment, the flexible Ethernet mapping process provides disassociation between N PMD and M DWDM lines, N and M are integers.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A flexible mapping method, implemented in circuitry, to map a Physical Coding Sublayer (PCS) structure from one of Flexible Ethernet and Multi Link Gearbox (MLG) to Optical Transport Network (OTN), the flexible mapping method comprising:

receiving one or more Virtual Lanes from the one of Flexible Ethernet and MLG;

mapping each of the one or more Virtual Lanes into an associated Tributary Slot utilizing a Bit-synchronous Mapping Procedure (BMP) in an Optical channel Payload Unit flex (OPUflex) that is mapped into an Optical channel Data Unit flex (ODUflex) in OTN, wherein a Payload Type (PT) is defined in the OPUflex with a rate and number of the Tributary Slots set based on a rate and number of the one or more Virtual Lanes, wherein the Tributary Slots have a rate comparable to a rate of the one or more Virtual Lanes; and utilizing Remote Management (RM) channels or specific Alignment Markers (AM) to communicate a status of the one or more Virtual Lanes in the corresponding Tributary Slots between a router and transport equipment containing the circuitry, wherein the status includes an unused or Open Connection Indication (OCI)) for each of the one or more Virtual Lanes, and the status is communicated from one of the router and the transport equipment to the other, wherein the Virtual Lane is one of about 5 Gb/s and about 25 Gb/s, and wherein the Payload Type (PT) is defined in OTN designating a Tributary Slot of one of about 5 Gb/s and about 25 Gb/s based on a size of the Virtual Lane.

2. The flexible mapping method of claim 1, further comprising:
resizing the ODUflex responsive to a change in a number of the one or more Virtual Lanes.

3. The flexible mapping method of claim 1, further comprising:
mapping the associated Tributary Slots into the Optical channel Data Unit flex (ODUflex); and
performing one of providing the ODUflex to an OTN switch, mapping the ODUflex into an Optical channel Transport Unit k (k=0, 1, 2, 3, 4, flex) or C=100×n (n=1, 2, 3, . . . ) (OTUk/Cn), or aggregating the ODUflex with other signals in the OTUk/Cn.

4. A transport system configured to map a Physical Coding Sublayer (PCS) from one of Flexible Ethernet and Multi Link Gearbox (MLG) to Optical Transport Network (OTN), the transport system comprising:
circuitry configured to receive one or more Virtual Lanes from the one of Flexible Ethernet and MLG;
circuitry to map each of the one or more Virtual Lanes into an associated Tributary Slot utilizing a Bit-synchronous Mapping Procedure (BMP) in an Optical channel Payload Unit flex (OPUflex) that is mapped into an Optical channel Data Unit flex (ODUflex) in OTN, wherein a Payload Type (PT) is defined in the OPUflex with a rate and number of the Tributary Slots set based on a rate and number of the one or more Virtual Lanes, wherein the Tributary Slots have a rate comparable to a rate of the one or more Virtual Lanes; and
circuitry configured to utilize Remote Management (RM) channels or specific Alignment Markers (AM) to communicate a status of the one or more Virtual Lanes in the corresponding Tributary Slots between a router and the transport system, wherein the status includes an unused or Open Connection Indication (OCI)) for each of the one or more Virtual Lanes, and the status is communicated from one of the router and the transport equipment to the other,
wherein the Virtual Lane is one of about 5 Gb/s and about 25 Gb/s, and wherein the Payload Type (PT) is defined in OTN designating a Tributary Slot of one of about 5 Gb/s and about 25 Gb/s based on a size of the Virtual Lane.

5. The transport system of claim 4, further comprising:
circuitry configured to resize the ODUflex responsive to a change in a number of the one or more Virtual Lanes.

6. The transport system of claim 4, further comprising:
circuitry configured to map the associated Tributary Slots into the Optical channel Data Unit flex (ODUflex); and
circuitry configured to perform one of providing the ODUflex to an OTN switch, mapping the ODUflex into an Optical channel Transport Unit k (k=0, 1, 2, 3, 4, flex) or C=100×n (n=1, 2, 3, . . . ) (OTUk/Cn), or aggregating the ODUflex with other signals in the OTUk/Cn.

7. A flexible de-mapping method, implemented in circuitry, to de-map Optical Transport Network (OTN) with Tributary Slots to Virtual Lanes for one of Flexible Ethernet and Multi Link Gearbox (MLG), the flexible de-mapping method comprising:
receiving an OTN signal with one or more Tributary Slots contained therein;
de-mapping each of the one or more Tributary Slots to output a Virtual Lane for the one of Flexible Ethernet and MLG for each of the one or more Tributary Slots in an Optical channel Payload Unit flex (OPUflex) that is mapped into an Optical channel Data Unit flex (ODUflex) in utilizing a Bit-synchronous Mapping Procedure (BMP), wherein a Payload Type (PT) is defined in OTN with a rate and number of the one or more Tributary Slots set based on a rate and number of the Virtual Lane, wherein the Tributary Slots have a rate comparable to a rate of the one or more Virtual Lanes; and
utilizing Remote Management (RM) channels or specific Alignment Markers (AM) to communicate a status of the one or more Virtual Lanes in the corresponding Tributary Slots between a router and transport equipment containing the circuitry, wherein the status includes an unused or Open Connection Indication (OCI)) for each of the one or more Virtual Lanes, and the status is communicated from one of the router and the transport equipment to the other,
wherein the Virtual Lane is one of about 5 Gb/s and about 25 Gb/s, and wherein the Payload Type (PT) is defined in OTN designating a Tributary Slot of one of about 5 Gb/s and about 25 Gb/s based on a size of the Virtual Lane.

8. The flexible de-mapping method of claim 7, further comprising:
providing each of the Virtual Lanes to a router.

* * * * *